United States Patent
Gai et al.

(10) Patent No.: US 7,027,098 B2
(45) Date of Patent: Apr. 11, 2006

(54) PICTURE-SIGNAL PROCESSING APPARATUS AND METHOD USING WEIGHTING FOR BLACK-LEVEL CONTROL

(75) Inventors: Toshihiro Gai, Tokyo (JP); Junji Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 877 days.

(21) Appl. No.: 10/083,512

(22) Filed: Feb. 27, 2002

(65) Prior Publication Data

US 2002/0196371 A1    Dec. 26, 2002

(30) Foreign Application Priority Data

Jun. 26, 2001  (JP)  .............................. 2001-192669
Nov. 15, 2001  (JP)  .............................. 2001-350193

(51) Int. Cl.
 *H04N 5/16*    (2006.01)
(52) U.S. Cl. ..................................... 348/379
(58) Field of Classification Search ................ 348/379, 348/180, 181, 184, 189; 315/383–384, 1, 315/370
See application file for complete search history.

(56) References Cited

U.S. PATENT DOCUMENTS

| | | | |
|---|---|---|---|
| 4,110,790 A | * | 8/1978 | Wheeler ..................... 348/625 |
| 4,811,101 A | * | 3/1989 | Yagi ............................ 348/696 |
| 4,985,665 A | * | 1/1991 | Sendelweck ................. 315/386 |
| 5,212,545 A | * | 5/1993 | Kageyama ................... 348/655 |
| 5,255,080 A | * | 10/1993 | Kageyama et al. ......... 348/675 |
| 5,262,862 A | * | 11/1993 | Sadamatsu et al. ......... 348/679 |
| 5,278,476 A | * | 1/1994 | Ten Pierick et al. ........ 315/383 |
| 5,339,114 A | * | 8/1994 | Lagoni et al. .............. 348/673 |
| 5,416,533 A | * | 5/1995 | Kageyama ................... 348/673 |
| 5,892,337 A | * | 4/1999 | Van Den Broeke ......... 315/383 |
| 5,920,351 A | * | 7/1999 | Takeshima et al. ......... 348/379 |
| 6,069,660 A | * | 5/2000 | Sato ............................ 348/379 |

FOREIGN PATENT DOCUMENTS

| | | | | |
|---|---|---|---|---|
| JP | 36017377 A | * | 9/1985 | |
| JP | 362101179 A | * | 10/1985 | |
| JP | 2787494 B2 | | 6/1998 | |
| JP | 0200204680 A | * | 7/2000 | |

* cited by examiner

*Primary Examiner*—Paulos M. Natnael
(74) *Attorney, Agent, or Firm*—Birch, Stewart, Kolasch & Birch, LLP

(57) ABSTRACT

A digitized luminance signal, representing the luminance component of a picture signal, is adjusted according to data stored in a memory. The data are output according to the value of the digitized luminance signal and multiplied by a weighting signal generated according to the amount of black area represented by the digitized luminance signal. The digitized luminance signal is then multiplied by a value obtained from the weighted product data. Use of the weighting signal enables the luminance scale to be stretched and compressed according to various different control characteristics without the need to store separate data for each characteristic in the memory.

12 Claims, 15 Drawing Sheets

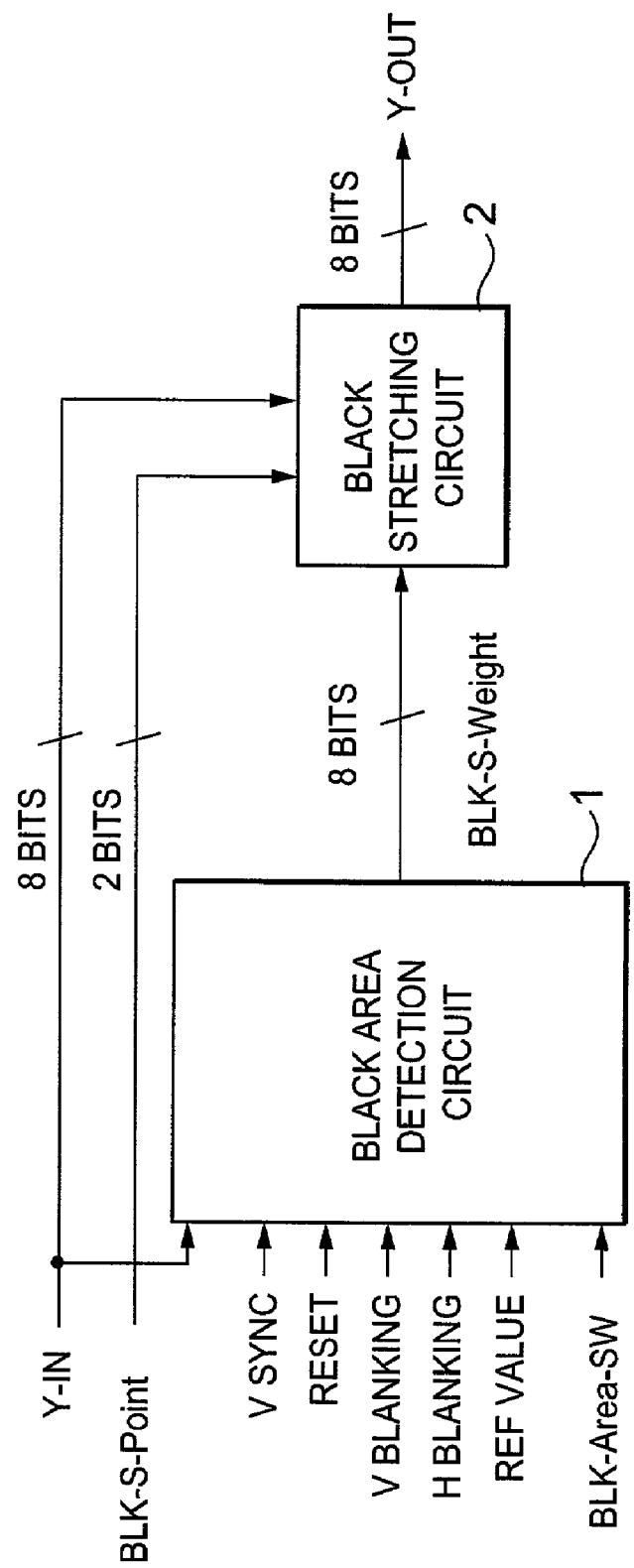

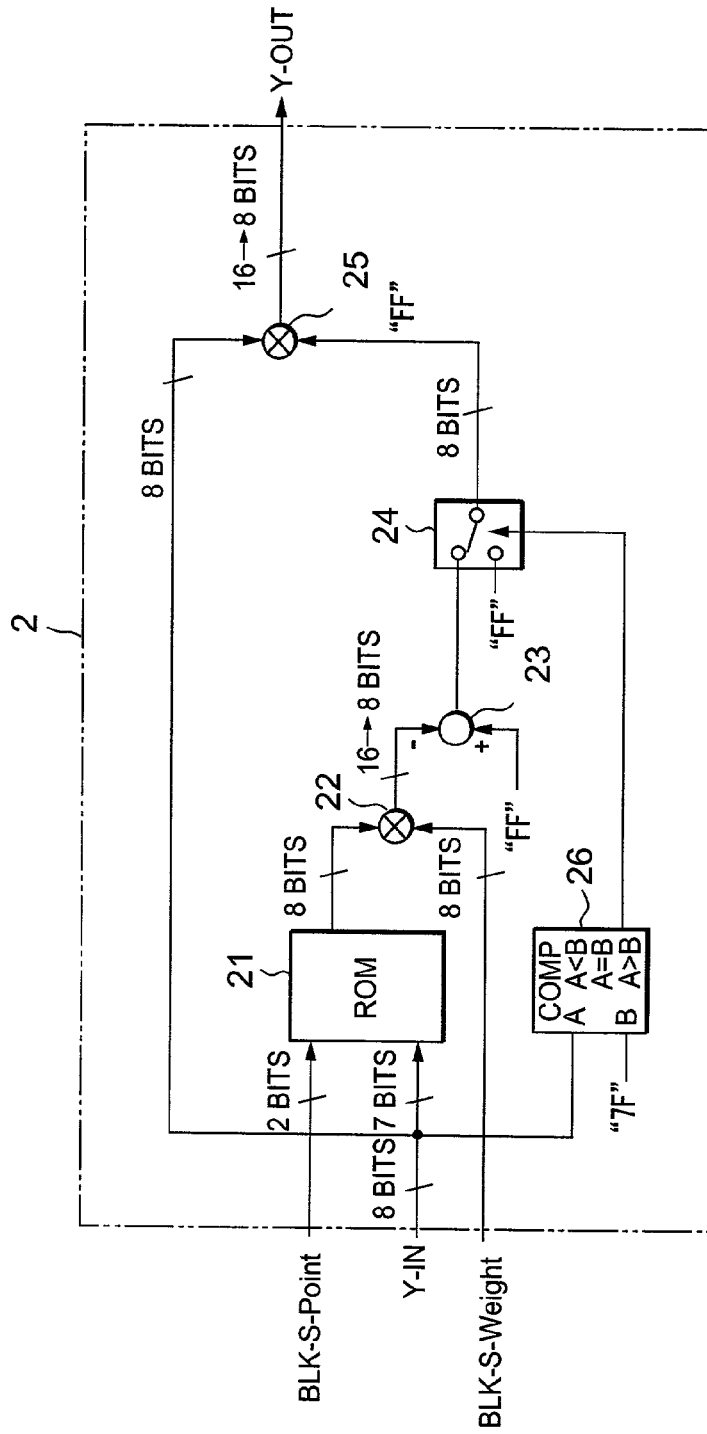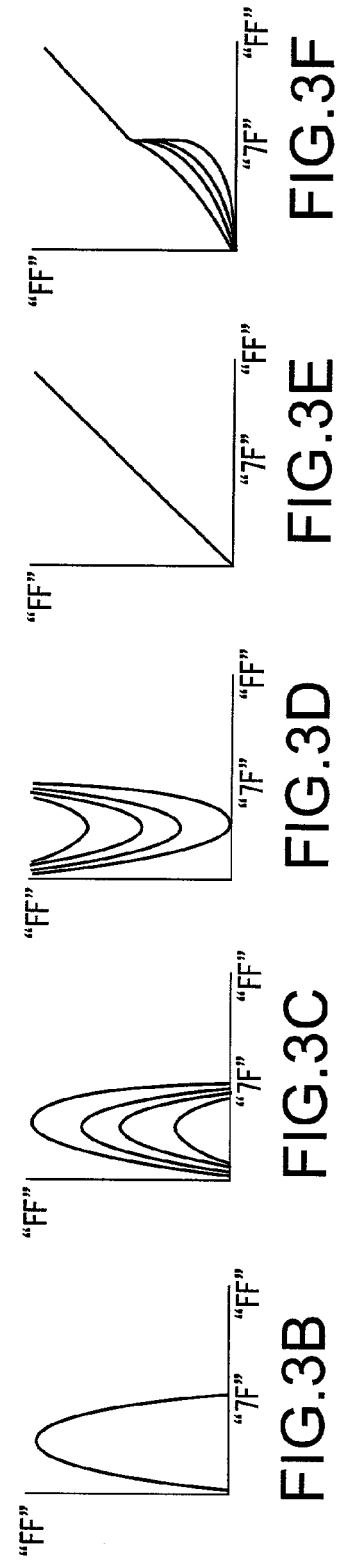

FIG.9

| COUNTF1D [16:15]<br>BLK-Area-SW [1:0] | '00' | '01' | '10' | '11' |
|---|---|---|---|---|
| '00' | "FF"- COUNTF1D [14:7] | "00" | "00" | "00" |
| '01' | "FF" | "FF"- COUNTF1D [14:7] | "00" | "00" |
| '10' | "FF" | "FF" | "FF"- COUNTF1D [14:7] | "00" |
| '11' | "FF" | "FF" | "FF" | "FF"- COUNTF1D [14:7] |

FIG.16

| COUNTF1D [16:15]<br>BLK-Area-SW [1:0] | '00' | '01' | '10' | '11' |
|---|---|---|---|---|
| '00' | COUNTF1D [14:7] | "FF" | "FF" | "FF" |
| '01' | "00" | COUNTF1D [14:7] | "FF" | "FF" |
| '10' | "00" | "00" | COUNTF1D [14:7] | "FF" |
| '11' | "00" | "00" | "00" | COUNTF1D [14:7] |

PICTURE-SIGNAL PROCESSING APPARATUS AND METHOD USING WEIGHTING FOR BLACK-LEVEL CONTROL

BACKGROUND OF THE INVENTION

The present invention relates to a method and apparatus for adjusting the black level of the luminance component of a digitized picture signal in a television receiver or the like, to obtain a clearer picture.

In a television picture with few black areas, the black areas tend to stand out from their surroundings, creating a displeasingly stark effect. It is known art to control the black level so as to prevent this effect. The solid line in FIG. 1 shows the general form of the input-output characteristic of a black level control circuit, with input (Y-IN) on the horizontal axis and output (Y-OUT) on the vertical axis. The letters IRE indicate the amplitude scale standardized by the Institute of Radio Engineers. The input luminance signal is modified by compressing the darkest luminance levels and stretching the less dark luminance levels toward the black direction, thereby lessening the difference between the darkest areas and the surrounding less dark areas. The stretching also makes fuller use of the luminance scale by bringing darker luminance levels closer to the reference black level. In FIG. 1, for example, an input signal varying between thirty and seventy IRE units is stretched to an output signal varying from substantially zero to seventy IRE units.

The black level control scheme illustrated in FIG. 1 can be implemented by a circuit including discrete analog components such as transistors and resistors, as described in Japanese Unexamined Patent Publication No. H3-195274, for example. Due to the use of very-large-scale integrated circuits in recent television receivers, however, the modern trend is to digitize the picture signal so that it can be processed entirely with digital circuitry. Since the input-output characteristic shown in FIG. 1 is nonlinear and cannot by generated by simple arithmetic operations, it must be stored as data in a read-only memory (ROM). Since the input-output characteristic takes on various shapes depending on the values of control parameters, as indicated by the dashed lines in FIG. 1, there is much data to be stored. With straightforward storage schemes, the necessary memory capacity is very large, making the fabrication cost of the digital circuitry comparatively high.

SUMMARY OF THE INVENTION

An object of the present invention is to reduce the amount of data that must be stored for black level control.

Another object of the invention is to reduce the amount of computation required for black level control.

The invention provides a method of controlling the black level of a digitized luminance signal by:

(a) storing data for adjusting the black level of the luminance signal in a memory;

(b) outputting the stored data according to the value of the digitized luminance signal;

(c) generating a weighting signal according to the amount of black area represented in the digitized luminance signal;

(d) multiplying the data output in step (b) by the weighting signal to obtain a product; and (e) multiplying the digitized luminance signal by a value responsive to the product.

The weighting steps (c and d) enable the black level to be controlled according to various different control characteristics without the need to store separate data for each characteristic in the memory. It is desirable, however, to store data for several different control characteristics, starting from different luminance levels, in the memory and select one of the characteristics according to another input signal.

The weighting signal can be generated by comparing the digitized luminance-signal with a reference value, counting occurrences of a particular comparison result, and generating the weighting signal from predetermined bits in the resulting count value. For example, the weighting signal may decrease from a maximum value to a minimum value over a range of count values selected by a switching signal, the range preferably being one in which the upper few bits of the count value have fixed values, to reduce the amount of computation required to generate the weighting signal.

The invention also provides a signal-processing apparatus with a memory, a black area detection circuit, and a pair of multipliers for carrying out the invented method of black level control.

BRIEF DESCRIPTION OF THE DRAWINGS

In the attached drawings:

FIG. 2 is a block diagram of a black level control circuit according to the present invention;

FIG. 3A is a block diagram showing the internal structure of the black stretching circuit in FIG. 2;

FIGS. 3B, 3C, 3D, 3E, and 3F show input-output characteristics at various points in the black stretching circuit in FIG. 3A;

FIG. 9 is a table of values output by the bit width converter in FIG. 5 in the first embodiment;

FIG. 16 is a table of values output by the bit width converter in FIG. 5 in the second embodiment.

DETAILED DESCRIPTION OF THE INVENTION

Figure 1:
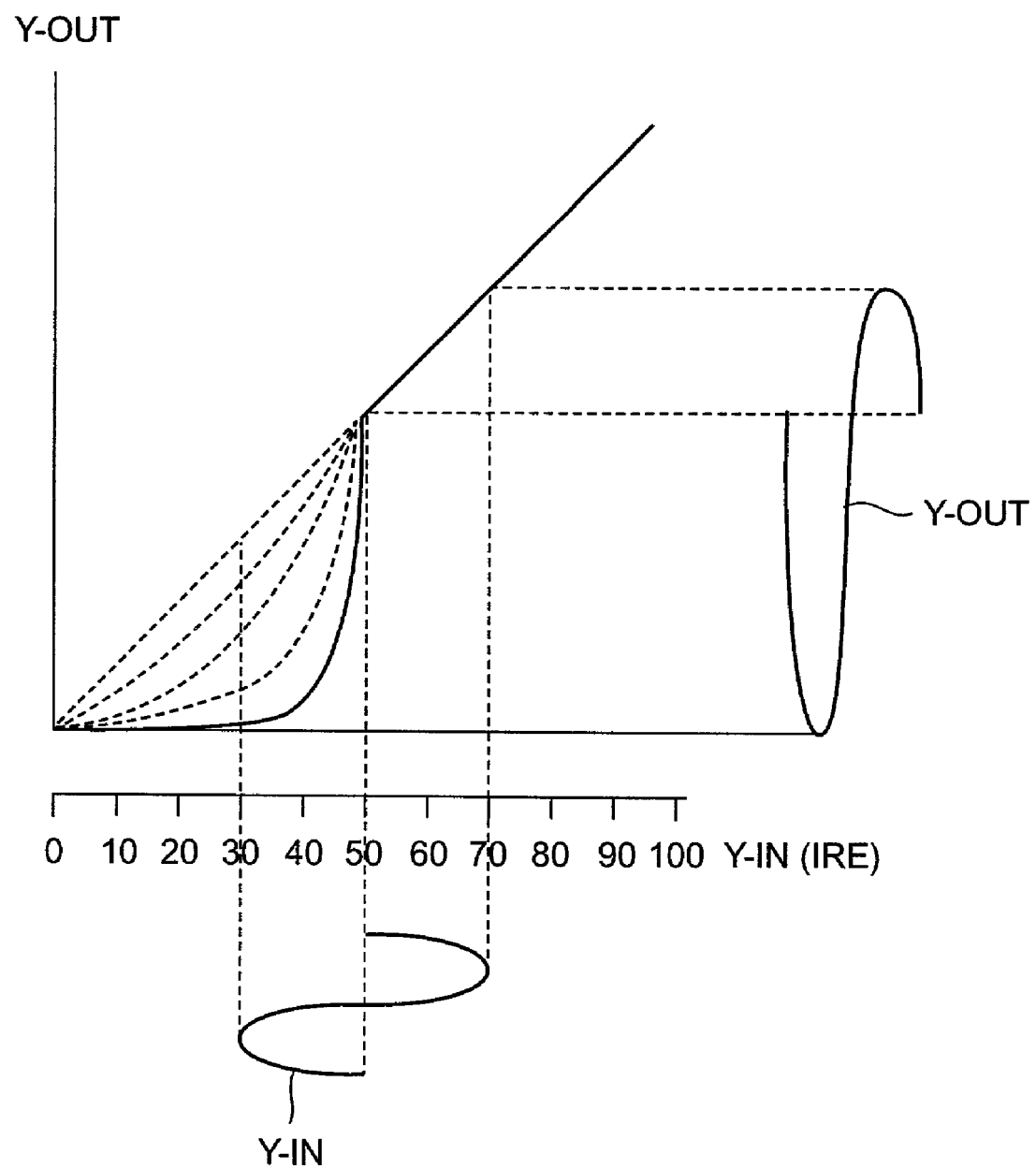
FIG. 1 is a graph illustrating the input-output characteristic of a black level control circuit.

Embodiments of the invention will be described with reference to the attached drawings, in which like parts are indicated by like reference characters. To distinguish different types of numerical values, binary values will be enclosed in single quotation marks, and hexadecimal values in double quotation marks. For example, '10' is binary and "7F" is hexadecimal.

Referring to FIG. 2, a first embodiment of the invention comprises a black area detection circuit 1 and a black stretching circuit 2, both of which receive an eight-bit input luminance signal Y-IN. The black area detection circuit 1 also receives a vertical (V) synchronization (SYNC) signal, a reset signal, a vertical blanking signal, a horizontal (H) blanking signal, a reference (REF) value, and a two-bit black area selection signal (BLK-Area-SW). The vertical synchronization signal divides the input luminance signal Y-IN into frames and fields. The black area detection circuit 1 calculates the area occupied by black picture elements (pixels) in one field. On the basis of this area, the black area detection circuit 1 generates an eight-bit weighting signal BLK-S-Weight, which is sent to the black stretching circuit 2. The black stretching circuit 2 also receives a two-bit signal BLK-S-Point, described later, which indicates the point on the luminance scale at which black stretching starts. The black stretching circuit 2 modifies the input luminance signal Y-IN according to the values of BLK-S-Weight and BLK-S-Point, thereby generating an eight-bit output luminance signal Y-OUT.

The values of the BLK-S-Point and BLK-Area-SW signals are set in a register block (not visible) by, for example, a microcontroller that controls the video signal processing carried out by the pair of circuits in FIG. 2 and other circuits (not visible). The microcontroller sends the signal values to the register block via, for example, an inter-IC (I²C) bus, which is a standard bus for interconnecting integrated circuits. From the register block, the BLK-Area-SW signal is supplied to the black area detection circuit 1 and the BLK-S-Point signal is supplied to the black stretching circuit 2.

Referring to FIG. 3A, the black stretching circuit 2 comprises a ROM 21, a multiplier 22, a subtractor 23, a selector 24, another multiplier 25, and a comparator 26.

The ROM 21 receives a nine-bit address including the lower seven bits of the input luminance signal Y-IN and the two-bit BLK-S-Point signal, and sends a corresponding eight-bit signal to multiplier 22. FIG. 3B illustrates the output of the ROM 21 when the BLK-S-Point value is '00,' showing the value of the lower seven bits of the input luminance signal Y-IN on the horizontal axis and the ROM output on the vertical axis.

Multiplier 22 multiplies the eight-bit signal from the ROM 21 by the eight-bit weighting signal BLK-S-Weight output from the black area detection circuit 1. The product is a sixteen-bit signal, of which the upper eight bits are sent to the subtractor 23 and the lower eight bits are discarded. FIG. 3C shows four examples of this product signal, corresponding to different BLK-S-Weight values, the value of the input luminance signal Y-IN appearing on the horizontal axis and the value of the product signal on the vertical axis.

The subtractor 23 subtracts the upper eight bits of the product signal from the hexadecimal value "FF" (decimal 255), and sends the resulting difference to the selector 24. FIG. 3D shows the same four examples as in FIG. 3C after this subtraction operation.

The selector 24 selects the eight-bit value received from the subtractor 23 when the output of the comparator 26 is '0,' selects the fixed eight-bit value "FF" when the output of the comparator 26 is '1,' and sends the selected value to multiplier 25.

The comparator 26 has two input terminals A and B and generates three outputs, the first output indicating whether A is less than B, the second output indicating whether A is equal to B, the third output indicating whether A is greater than B. In this case the A input is the input luminance signal Y-IN, the B input is the fixed hexadecimal value "7F," and only the third output is used. The comparator 26 thus compares the input luminance signal Y-IN with "7F;" its output signal goes to '1' when Y-IN exceeds "7F," and to '0' when Y-IN is equal to or less than "7F."

Black-level control is performed when the input luminance signal Y-IN is equal to or less than "7F" (decimal 127); that is, when the output of the comparator 26 is '0,' and the selector 24 sends the output of the subtractor 23 to multiplier 25. When the input luminance signal Y-IN exceeds "7F," the selector 24 sends "FF" to multiplier 25 and black-level control is not performed.

Multiplier 25 multiplies all eight bits of the input luminance signal Y-IN by the eight-bit output of the selector 24. The upper eight bits of the resulting sixteen-bit product become the output luminance signal Y-OUT. The lower eight bits are discarded. When the output of the selector 24 is the fixed value "FF," no black-level control is performed because the output luminance signal Y-OUT is linearly related to the input luminance signal Y-IN, as indicated in FIG. 3E, which shows Y-IN on the horizontal axis and Y-OUT on the vertical axis. When the selector 24 selects the output of the subtractor 23, the relationship between Y-IN and Y-OUT is not linear, but is stretched and compressed as shown in FIG. 3F. Black-level control is thus performed on the relatively dark part of the input luminance signal Y-IN, with a luminance not exceeding fifty on the IRE scale, as shown in FIG. 1.

Figure 4:
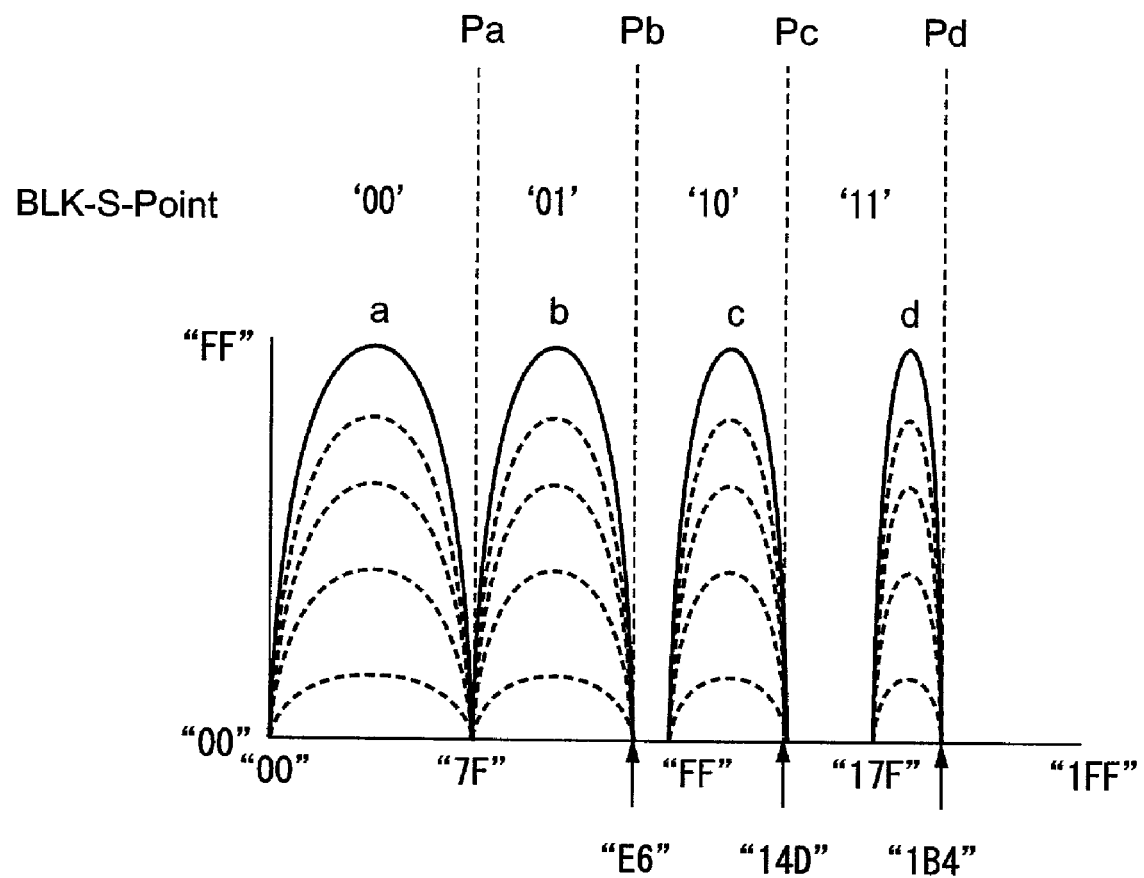
FIG. 4 is a graph illustrating data stored in the ROM in FIG. 2.

FIG. 4 shows the input-output characteristics stored as data in the ROM 21. Four different characteristics are stored, identified in FIG. 4 by the lower-case letters a, b, c, and d. These characteristics can be described by the following mathematical formulas.

$$255 \cdot \sin(x\pi/Pa) \tag{a}$$

$$255 \cdot \sin(x-\text{``7F''})\pi/(Pb-Pa) \tag{b}$$

$$255 \cdot \sin(x-\text{``FF''})\pi/(Pc-Pb) \tag{c}$$

$$255 \cdot \sin(x-\text{``17F''})\pi/(Pd-Pc) \tag{d}$$

In these equations, the letter 'x' denotes the nine-bit input to the ROM 21. Pa, Pb, Pc, and Pd are points at which black-level control begins. In the present embodiment, Pa is "7F" (decimal 127), Pb is "E6" (decimal 230), Pc is "14D" (decimal 333), and Pd is "1B4" (decimal 436). The solid line labeled 'a' in FIG. 4 covers the range of luminance levels from zero up to "7F" (decimal 127). The solid lines labeled 'b' covers levels up to "E6"–"7F" (decimal 230–127, or decimal 103). Similarly, the solid lines labeled 'c' and 'd' cover luminance levels up to "14D"–"FF" (decimal 78), and "1B4"–"17F" (decimal 53), respectively.

In the nine-bit input signal received by the ROM 21, the two-bit BLK-S-Point signal forms the upper two bits, and the lower seven bits of the input luminance signal Y-IN form the lower seven bits. Accordingly, when the BLK-S-Point signal is '00,' the address input to the ROM 21 is in the range from "00" to "7F." Similarly, when the BLK-S-Point signal is '01' the address input to the ROM 21 is in the range from "7F" to "FF," when the BLK-S-Point signal is '10' the address input to the ROM 21 is in the range from "FF" to "17F," and when the BLK-S-Point signal is '11' the address input to the ROM 21 is in the range from "17F" to "1FF."

When the BLK-S-Point signal is '00,' the output of the ROM 21 follows curve 'a' in FIG. 4, rising from "00" (zero) to "FF" (decimal 255), then returning to "00" again. When the BLK-S-Point signal is '01,' '10', or '11,' the output of the ROM 21 follows curve 'b,' 'c,' or 'd' in FIG. 4. Thus the two-bit BLK-S-Point signal selects one of four input-output characteristics.

When the BLK-S-Point signal is '00' and the first characteristic (a) in FIG. 4 is used, black level control starts at an input luminance level of fifty on the IRE scale. The example waveforms of Y-IN and Y-OUT in FIG. 1 illustrate this case in which BLK-S-Point is '00.' Below the 50-IRE input luminance level, the output luminance signal (the upper eight bits of the sixteen-bit signal obtained by multiplication of the input luminance signal by the output of the selector 24) is stretched toward the black direction, the lowest luminance levels consequently being compressed. In similar fashion, black level control starts at the 40-IRE level when the BLK-S-Point signal is '01,' at the 30-IRE level when the BLK-S-Point signal is '10', and at the 20-IRE level when the BLK-S-Point signal is '11.'

The eight-bit signal output from the ROM 21 is multiplied in multiplier 22 by the eight-bit weighting signal BLK-S-Weight. As the value of the eight-bit weighting signal BLK-S-Weight decreases, the value output from multiplier 22 also decreases. Accordingly, as the value of BLK-S-Weight decreases, the characteristics indicated by the solid lines in FIG. 4 are brought down toward zero, as indicated by the dotted lines in FIG. 4. The output of the subtractor 23 accordingly approaches the fixed value "FF," with the result that the input-output characteristic of the black level control circuit as a whole moves through the characteristics shown by dotted lines in FIG. 1 and approaches a linear characteristic.

The BLK-S-Weight signal is output from the black area detection circuit 1. The purpose of black level control is to prevent the 'floating black' effect in which, in a picture with few black elements, the black elements appear to stand out from their surroundings, but the amount of black compression needs to be adjusted according to the total size of the black areas in a picture. The less black there is in the picture, the more the black levels can be compressed without loss of picture quality. The black area detection circuit 1 counts pixels with luminance levels equal to or less than a predetermined level, considered to represent the threshold of black; thereby detects the total number of black pixels in one field; and outputs the BLK-S-Weight signal according to the detected total number of black pixels.

Figure 5:
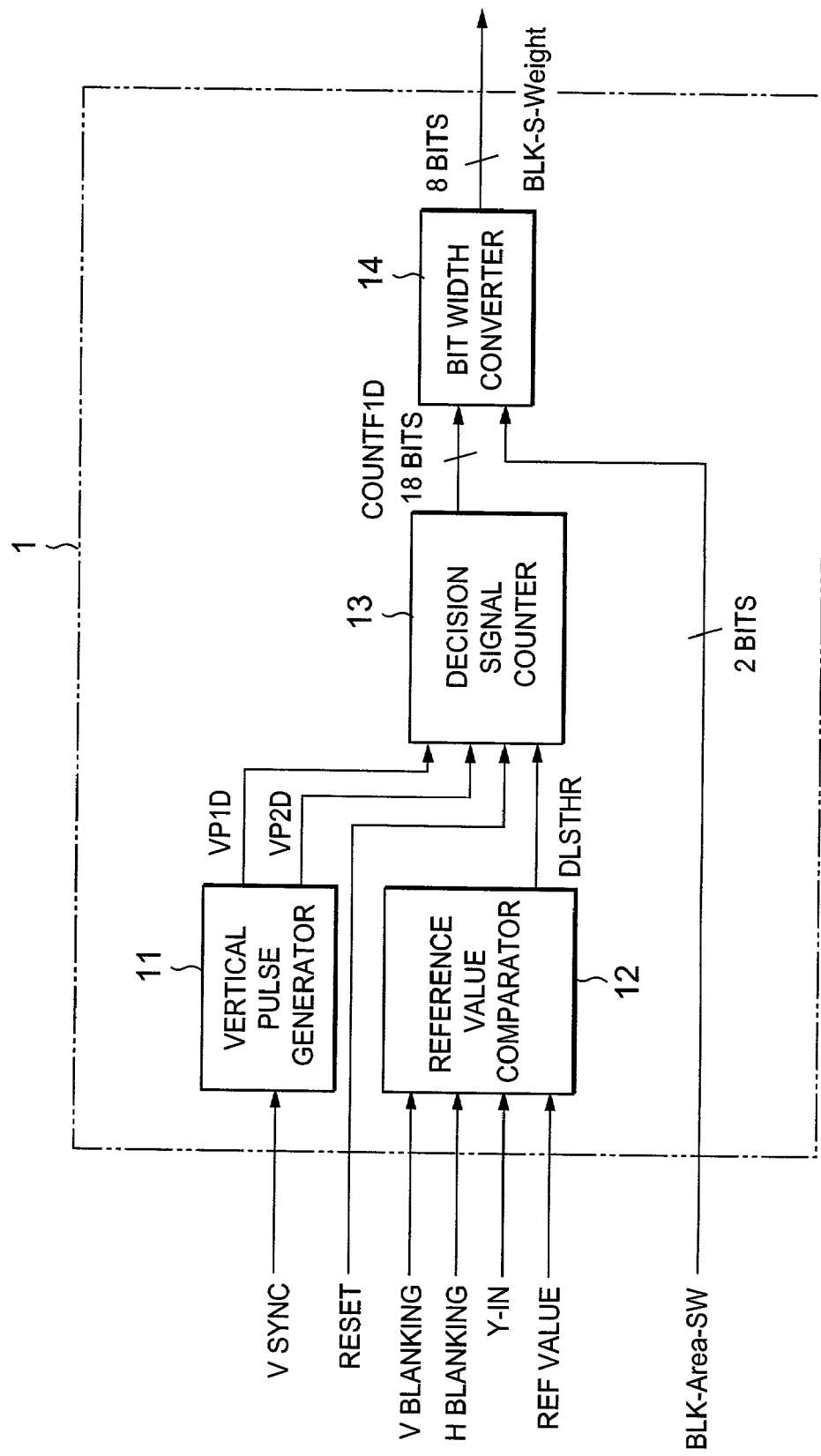
FIG. 5 is a block diagram showing the internal structure of the black area detection circuit in FIG. 2.

FIG. 5 shows the internal structure of the black area detection circuit 1. The black area detection circuit 1 comprises a vertical pulse generator 11, a reference value comparator 12, a decision signal counter 13, and a bit width converter 14.

The vertical pulse generator 11 receives the vertical synchronization signal and generates a corresponding pair of pulse signals VP1D and VP2D.

The reference value comparator 12 receives the input luminance signal Y-IN, a reference value designating the threshold black level, and the vertical and horizontal blanking signals, and sends a less-than-reference decision signal DLSTHR to the decision signal counter 13. Specifically, the reference value comparator 12 compares the input luminance signal Y-IN with the reference value, and sets the decision signal DLSTHR to '1' when the input luminance signal Y-IN is equal to or less than the reference value, unless the vertical blanking signal or horizontal blanking signal is equal to '1,' indicating that the current pixel is disposed in the vertical or horizontal blanking area. When the current pixel is disposed in one of these blanking areas, or its value exceeds the reference value, the decision signal DLSTHR is cleared to '0.'

The decision signal counter 13 counts the number of black pixels occurring in one field, as indicated by the decision signal DLSTHR. The decision signal counter 13 also receives the reset signal and the pulse signals VP1D, VP2D generated by the vertical pulse generator 11. Input of these signals resets the decision signal counter 13, so that a new count starts in each field. The total count of black pixels in each field is output as an eighteen-bit signal COUNTF1D to the bit width converter 14.

The bit width converter 14 converts the eighteen-bit count signal COUNTF1D to the eight-bit BLK-S-Weight signal, operating according to the black area selection signal BLK-Area-SW.

Figure 6:
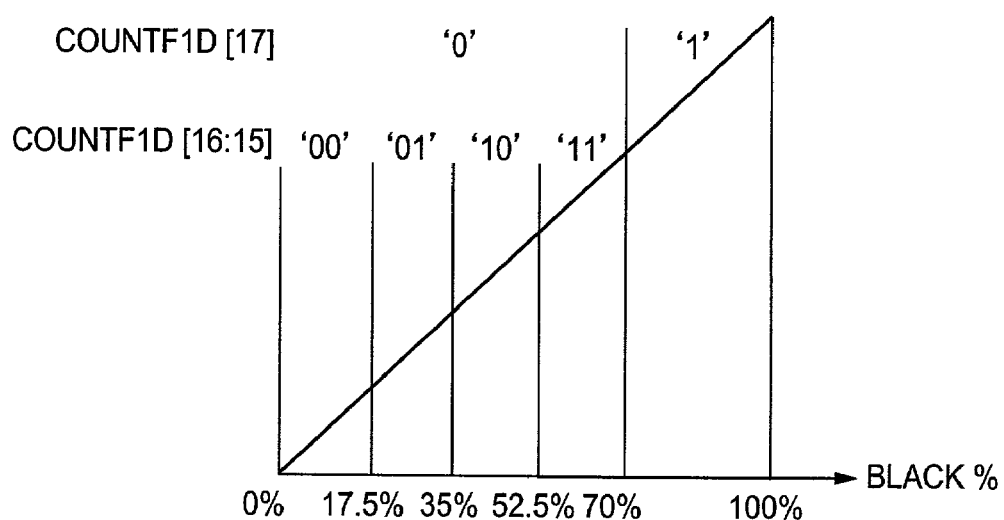
FIG. 6 is a graph illustrating the values of three bits in the output of the decision signal counter in FIG. 5 in a first embodiment of the invention.

When the input luminance signal Y-IN is an NTSC signal, that is, a signal conforming to standards set by the National Television System Committee, the number of pixels per field is 189,924, which is expressible as an eighteen-bit binary number. The largest number that can be expressed by seventeen binary bits is 131,071, which is substantially seventy percent (70%) of 189,924. Accordingly, if the most significant bit of the decision signal DLSTHR is set to '1,' then from 70% to 100% of the pixels in the field are black. If the most significant bit is '0,' then the proportion of black pixels in the field is from 0% to 17.5% if the next two bits (bits 16 and 15) are '00,' from 17.5% to 35% if those two bits are '01,' from 35% to 52.5% if those two bits are '10,' and from 52.5% to 70% if those two bits are '11.' This is illustrated in FIG. 6, in which COUNTF1D(17) indicates the most significant bit, and COUNTF1D(16:15) indicates the next two bits. The horizontal axis in FIG. 6 indicates the proportion of black pixels in one field, in percent (%), while the vertical axis indicates the COUNTF1D value.

Figure 7:
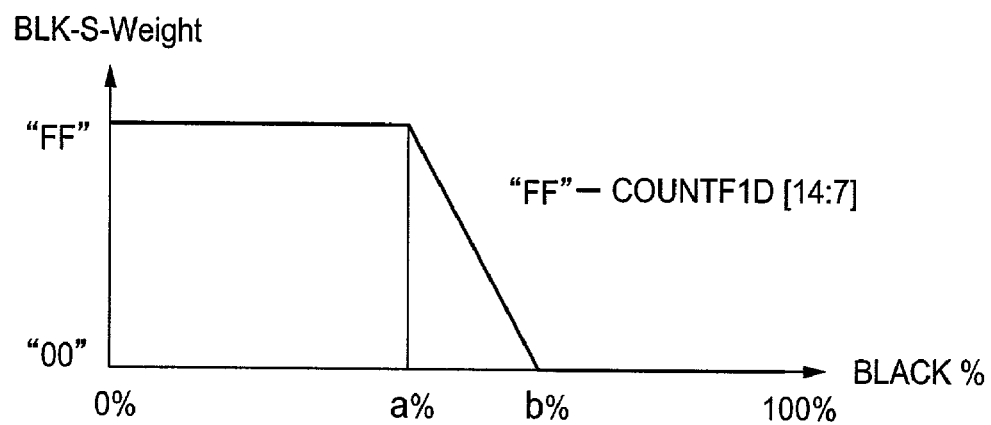
FIG. 7 is a graph illustrating the general form of the output of the bit width converter in FIG. 5.

In the present embodiment, the weighting signal BLK-S-Weight is generated as shown in FIG. 7, in which the vertical axis indicates the value of the BLK-S-Weight signal and the horizontal axis indicates the proportion of black pixels in a field. The BLK-S-Weight signal has the maximum value ("FF") when this proportion is equal to or less than a first proportion (a%), has the minimum value ("00") when the proportion is equal to or greater than a second proportion (b%), and varies linearly from the maximum value to the minimum value over the range between these proportions (a% to b%). In this range, the BLK-S-Weight signal is complementary to the eighth to fifteenth bits of the COUNTF1D signal, denoted COUNTF1D(14:7).

Figure 8:
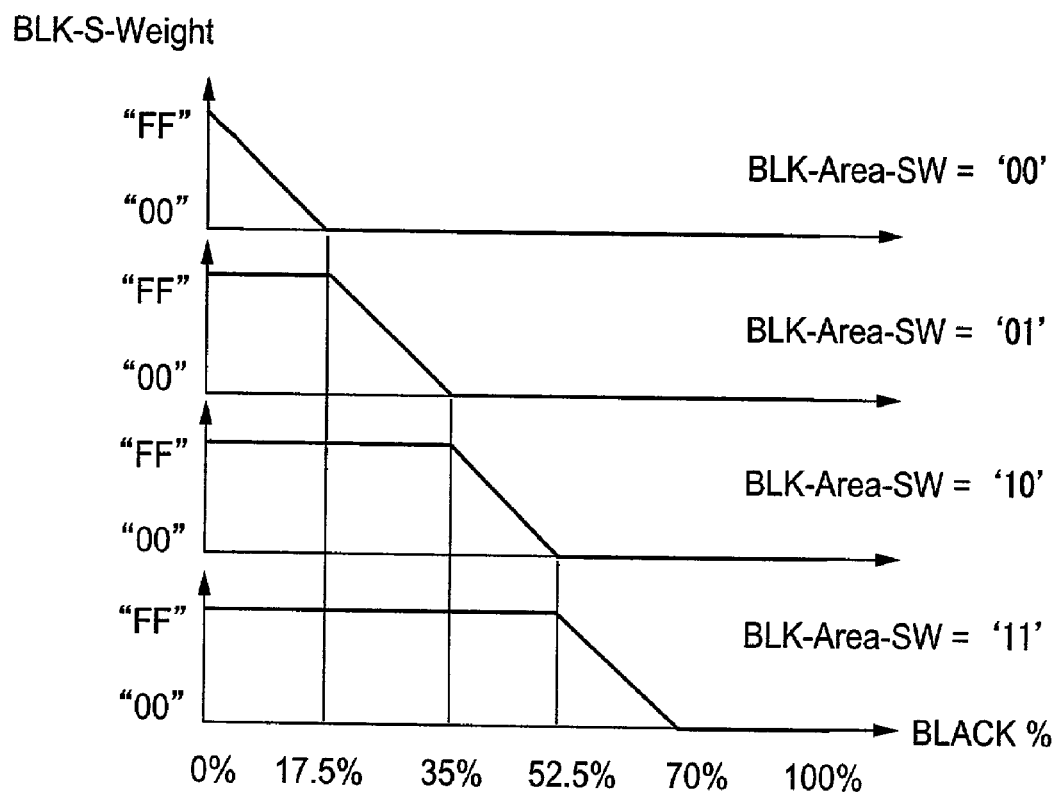
FIG. 8 is a graph illustrating the full output of the bit width converter in FIG. 5 in the first embodiment.

The first and second proportions (a% and b%) in FIG. 7 depend on the black area selection signal BLK-Area-SW as shown in FIG. 8. Thus, the BLK-S-Weight signal has four input-output characteristics, which are selected by the black area selection signal BLK-Area-SW. When the BLK-Area-SW signal is '00,' the a%–b% range is 0%–17.5%. Similarly, the a%–b% range is 17.5%–35% when BLK-Area-SW is '01,' 35%–72.5% when BLK-Area-SW is '10,' and 52.5%–70% when BLK-Area-SW is '11.'

The bit width converter 14 in FIG. 5 generates the BLK-S-Weight signal according to the black area selection signal BLK-Area-SW and the count signal COUNTF1D as shown in FIG. 8. The black area can be estimated as shown in FIG. 6, according to the seventeenth and sixteenth bits of COUNTF1D. FIG. 9 gives explicit formulas for the output of the bit width converter 14 according to the black area selection signal BLK-Area-SW and the count signal COUNTF1D. The BLK-S-Weight signal is obtained by simple selection and complementation logic in the bit width converter 14, without the need for arithmetic operations or other extensive computation. For example, when the black area selection signal BLK-Area-SW is '10,' the BLK-S-Weight signal is equal to "FF" if COUNTF1D(16:15) (the seventeenth and sixteenth bits of COUNTF1D) is '00' or '01,' is equal to "FF"—COUNTF1D(14:7), i.e., the one's complement of COUNTF1D(14:7), if COUNTF1D(16:15) is '10,' and is equal to "00" if COUNTF1D(16:15) is '11.'

For each value of the black area selection signal BLK-Area-SW, the BLK-S-Weight values varies smoothly from "00" to "FF" according to the count signal COUNTF1D. This smooth variation of the weighting in the first embodiment ensures that gradual changes in the input luminance signal Y-IN from one field to the next produce correspondingly gradual changes in the output luminance signal Y-OUT, so that a natural video picture is obtained. Moreover, for each of the four starting points that can be selected by the BLK-S-Point signal, an appropriate weighting characteristic can be selected by the BLK-Area-SW signal. For example, when carried out over the maximum luminance range of zero to fifty IRE units (BLK-S-Point='00'), black level control can be confined to video fields in which at most 17.5% of the picture elements are black (BLK-Area-SW='00'). When restricted to the luminance range from zero to twenty IRE units (BLK-S-Point='11'), black level control can be carried out in video fields with up to substantially 70% black picture elements (BLK-Area-SW='11').

It remains to describe the internal structure of the vertical pulse generator 11, reference value comparator 12, and decision signal counter 13 in the black area detection circuit 1. These circuits operate according to a pixel clock signal that is not explicitly indicated in the drawings.

Figure 10:
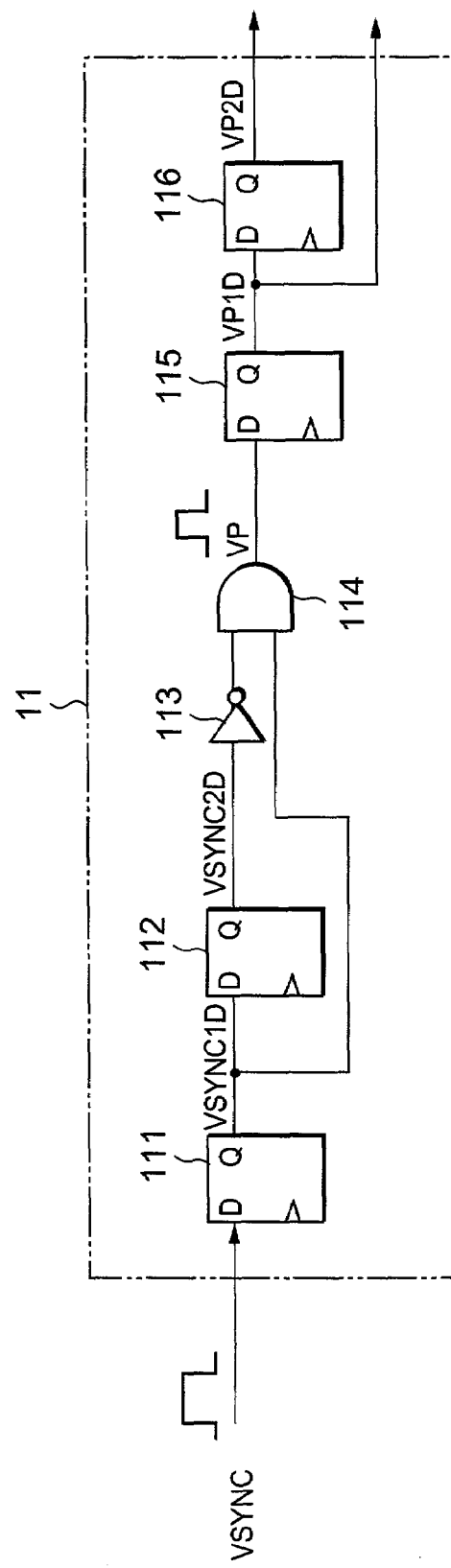
FIG. 10 is a circuit diagram of the vertical pulse generator in FIG. 5.

FIG. 10 shows the internal structure of the vertical pulse generator 11. D-type flip-flop 111 delays the vertical synchronization signal by one clock period. The delayed signal VSYNC1D is delayed by a further clock period in D-type flip-flop 112, generating a further delayed signal VSYNC2D, which is inverted by an inverter 113. The resulting inverted signal and VSYNC1D are supplied to an AND gate 114, which generates a pulse signal VP with a width of one clock period when the vertical synchronization signal goes high. This pulse signal VP is then delayed by one clock period in D-type flip-flop 115 to generate VP1D, and by another clock period in D-type flip-flop 116 to generate VP2D. These signals VP1D, VP2D enable and-clear circuits in the decision signal counter 13 in FIG. 5, as described below.

Figure 11:
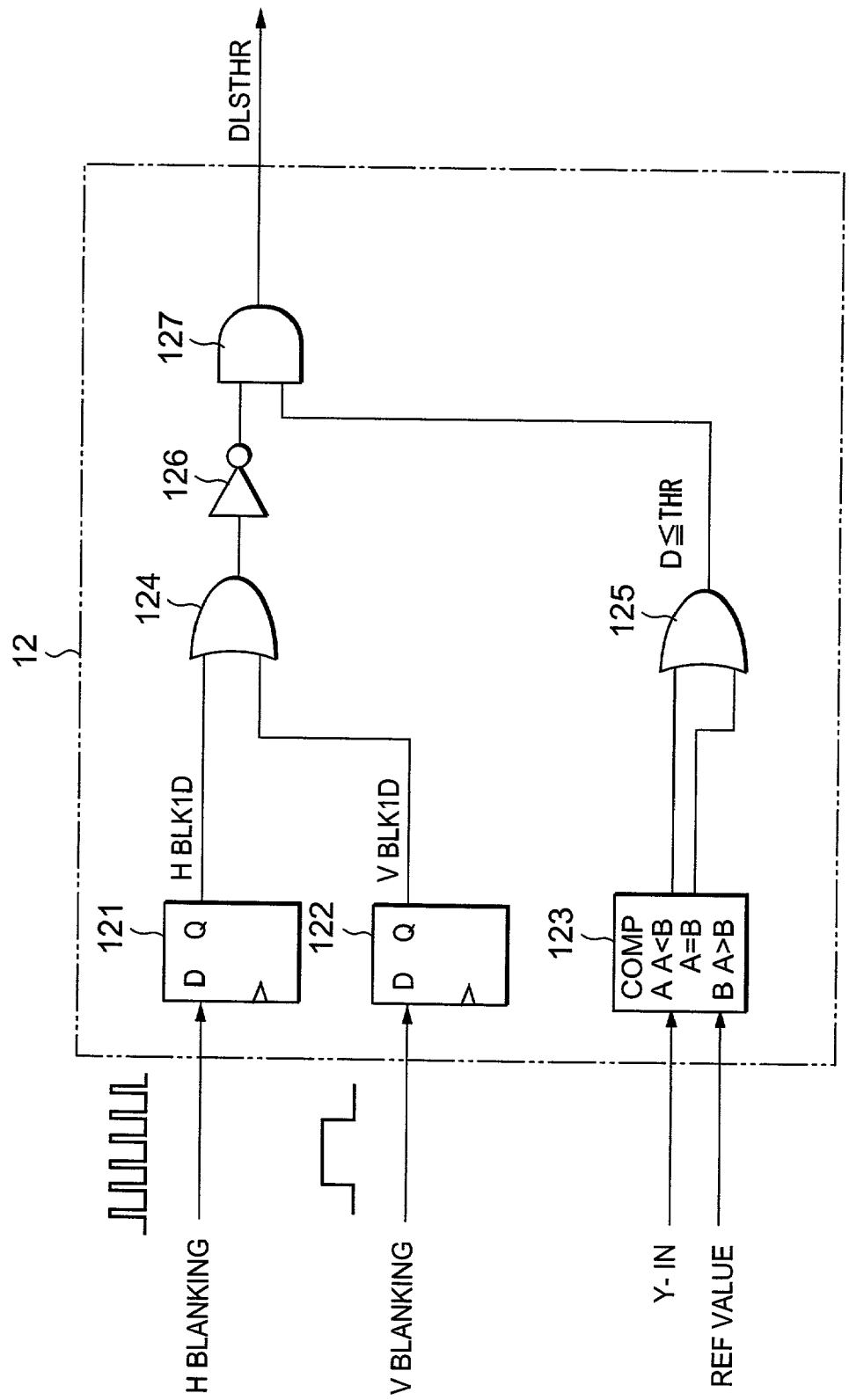
FIG. 11 is a circuit diagram of the reference value comparator in FIG. 5 in the first embodiment.

FIG. 11 shows the internal structure of the reference value comparator 12. The horizontal blanking signal and vertical blanking signal are delayed in respective D-type flip-flops 121, 122, which output delayed signals HBLK1D, VBLK1D. These delayed signals are combined by an OR gate 124, the output of which is inverted by an inverter 126. The input luminance signal Y-IN and the reference value are compared by a comparator 123 similar to the comparator described earlier, having two inputs (A and B) and three outputs. The first and second outputs (A<B and A=B) are combined by another OR gate 125 to obtain a comparison result that is '1' if the input luminance signal Y-IN is equal to or less than the reference value, and '0' if the input luminance signal Y-IN exceeds the reference value. The outputs of the OR gate 125 and inverter 126 are supplied to an AND gate 127, the output of which is the decision signal DLSTHR. Accordingly, the decision signal DLSTHR indicates whether each pixel in the effective part of the input luminance signal Y-IN, excluding vertical and horizontal blanking intervals, is black or not, where black is defined as any luminance value equal to or less than the reference value.

Figure 12:
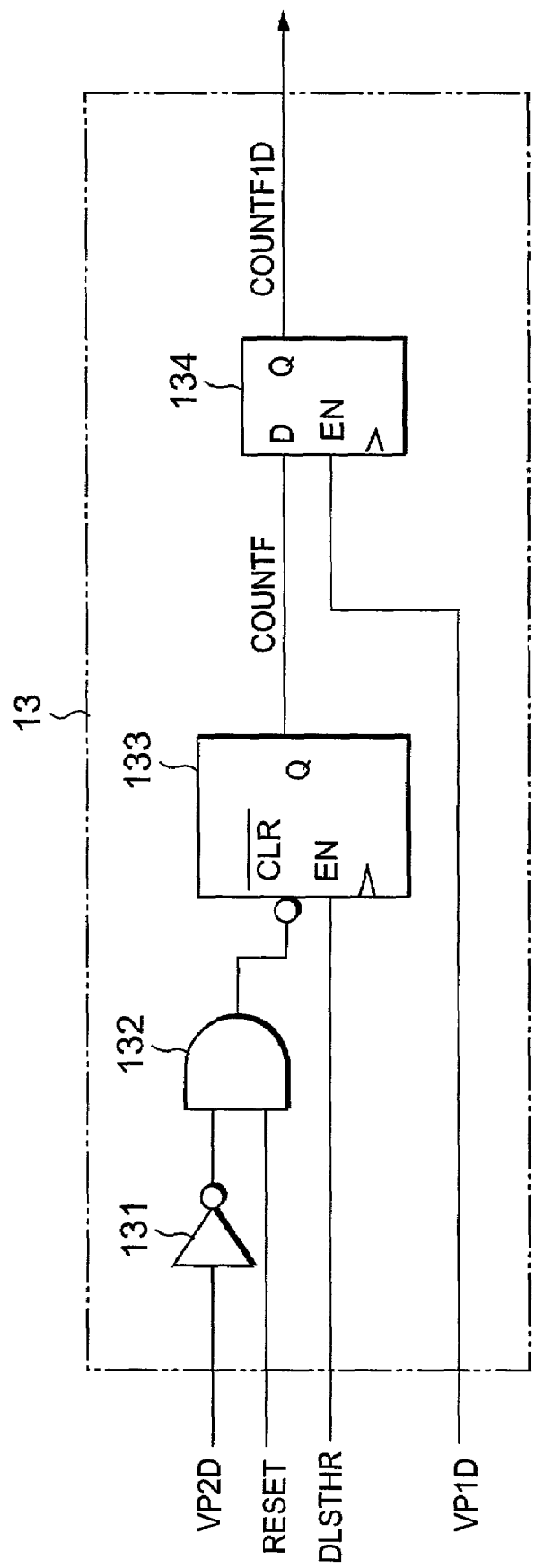
FIG. 12 is a circuit diagram of the decision signal counter in FIG. 5.

FIG. 12 shows the internal structure of the decision signal counter 13. The delayed signal VP2D from the vertical pulse generator 11 (FIG. 10) is inverted by an inverter 131, and the inverted pulse signal is supplied together with the reset signal to an AND gate 132. The output of the AND gate is supplied as a clear (CLR) signal to a counter 133. The decision signal DLSTHR from the reference value comparator 12 is supplied as an enable (EN) signal to this counter 133. While DLSTHR is '1,' the counter 133 counts black pixels by counting pixel clock cycles. The output of the counter 133 is a count signal denoted COUNTF. This signal is stored in an eighteen-bit D-type flip-flop 134 in synchronization with the VP1D signal from the vertical pulse generator 11 and output from D-type flip-flop 134 as the count signal COUNTF1D. Accordingly, the value of COUNTF1D is stored in the D-type flip-flop 134 at the end of each field, and one clock cycle later, the counter 133 is cleared to prepare for the counting of black pixels in the next field. The counter 133 is also cleared by the reset signal.

In the embodiment described above, the digital luminance signal was an eight-bit signal, the input to the ROM 21 was a nine-bit address signal, and the output of the ROM 21 was an eight-bit signal, but these numbers of bits can be varied. For example, the input and output digital luminance signals may be ten-bit signals, the BLK-S-Point signal may be a one-bit signal, the input to the ROM may be an eleven-bit signal, and the output from the ROM may be a ten-bit signal.

As another variation, the output of the ROM 21 may be reduced from eight bits to seven bits. In this case, the black level control becomes coarser, but the size of the ROM 21 can be reduced.

As yet another variation, the number of black pixels may be counted per frame instead of per field.

Whereas the first embodiment of the invention counts black pixels per field, it is also possible to count pixels that are not black, that is, pixels with luminance value exceeding the reference value. The second embodiment, described next, employs this counting method.

The second embodiment has the configuration shown in FIG. 2 and employs the same black stretching circuit 2, but changes the internal operation of the black area detection circuit 1. Referring again to FIG. 5, in the second embodiment, the reference value comparator 12 compares the input luminance signal Y-IN with the reference value, outputs a '1' when the input luminance level exceeds the reference value, and outputs a '0' when the input luminance level is equal to or less than the reference value. Pixels with luminance levels exceeding the reference value will be referred to as white-level pixels below.

Figure 13:
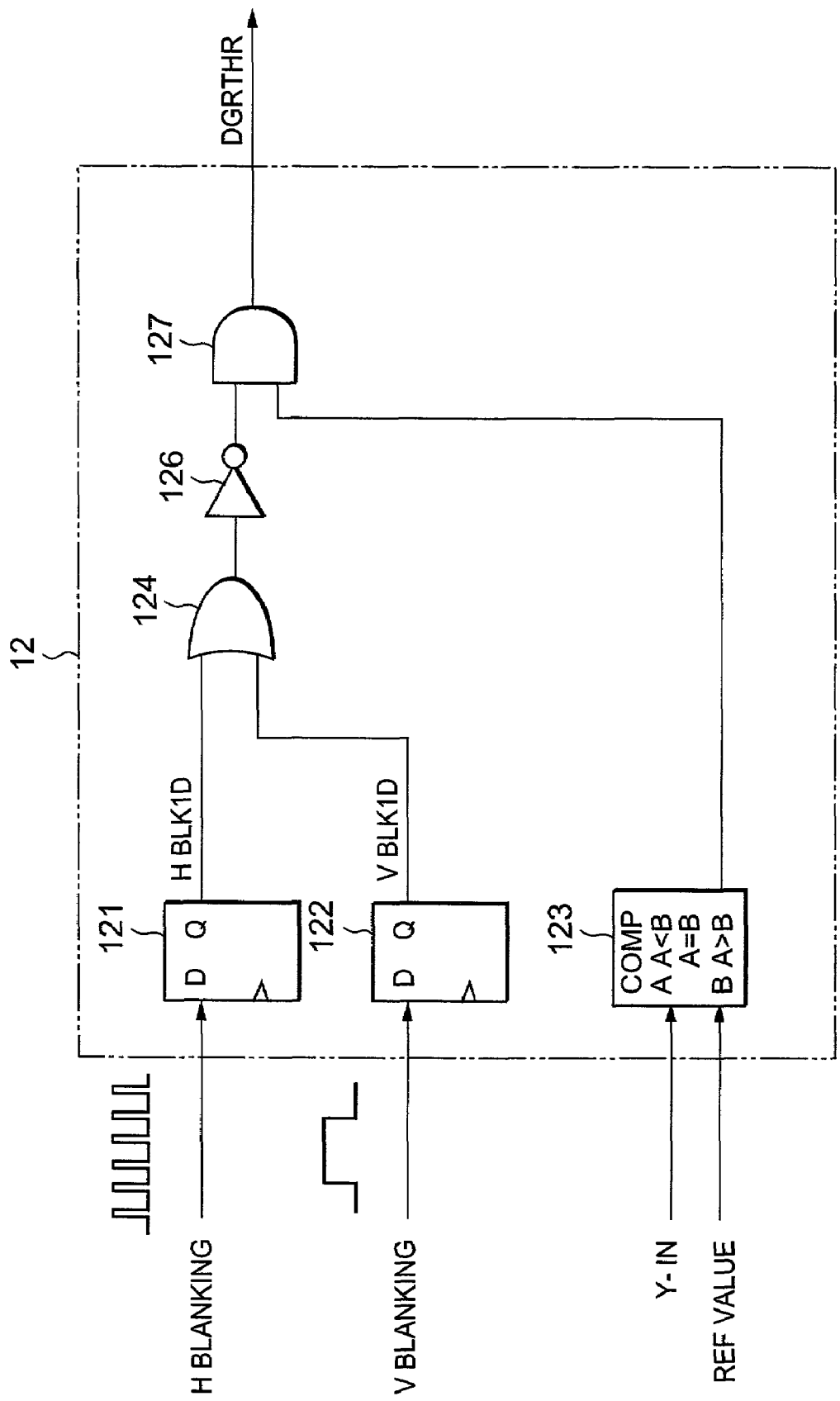
FIG. 13 is a circuit diagram of the reference value comparator in FIG. 5 in a second embodiment of the invention.

FIG. 13 shows the internal structure of the reference value comparator 12 in the second embodiment. This structure is similar to that in the first embodiment, except that now the third output (A>B) of the comparator 123 is used, and this output is passed directly to the AND gate 127. The AND gate 127 sends a greater-than-reference decision signal DGRTHR to the decision signal counter 13 in FIG. 5. The value of this decision signal DGRTHR is '1' when a white-level pixel occurs in the effective picture area.

The decision signal counter 13 accordingly counts the number of white-level pixels in each field. The eighteen-bit count signal output by the decision signal counter 13 in the second embodiment will again be denoted COUNTFLD. When the eighteenth bit COUNTF1D(18) is '0,' the proportion of white-level pixels in the field is from 0% to 17.5% if the next two bits (bits 17 and 16) of COUNTFLD are '00,' from 17.5% to 35% if those two bits are '01,' from 35% to 52.5% if those two bits are '10,' and from 52.5% to 70% if those two bits are '11.' The proportion of the field that is black is accordingly 82.5% to 100%, 65% to 82.5%, 47.5% to 65%, or 30% to 47.5%, respectively.

Figure 14:
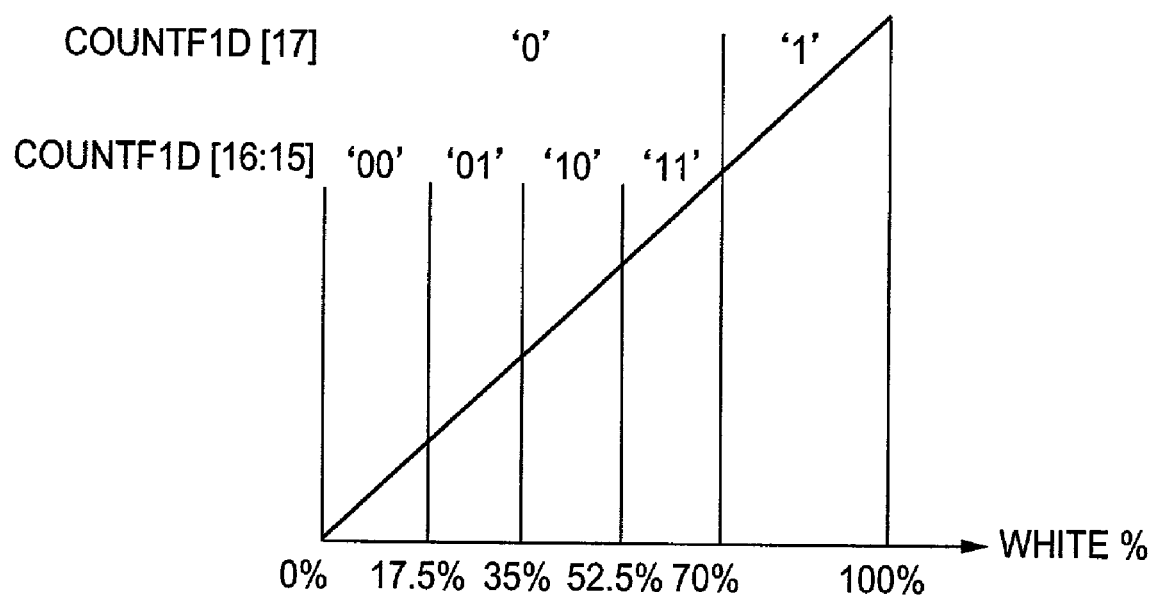
FIG. 14 is a graph illustrating the values of three bits in the output of the decision signal counter in FIG. 5 in the second embodiment.

FIG. 14 illustrates the proportion of white-level pixels for different combinations of the three most significant bits (the sixteenth to eighteenth bits) of the COUNTF1D signal. The horizontal axis indicates the proportion of white-level pixels in one field; the vertical axis indicates the COUNTF1D value.

Figure 15:
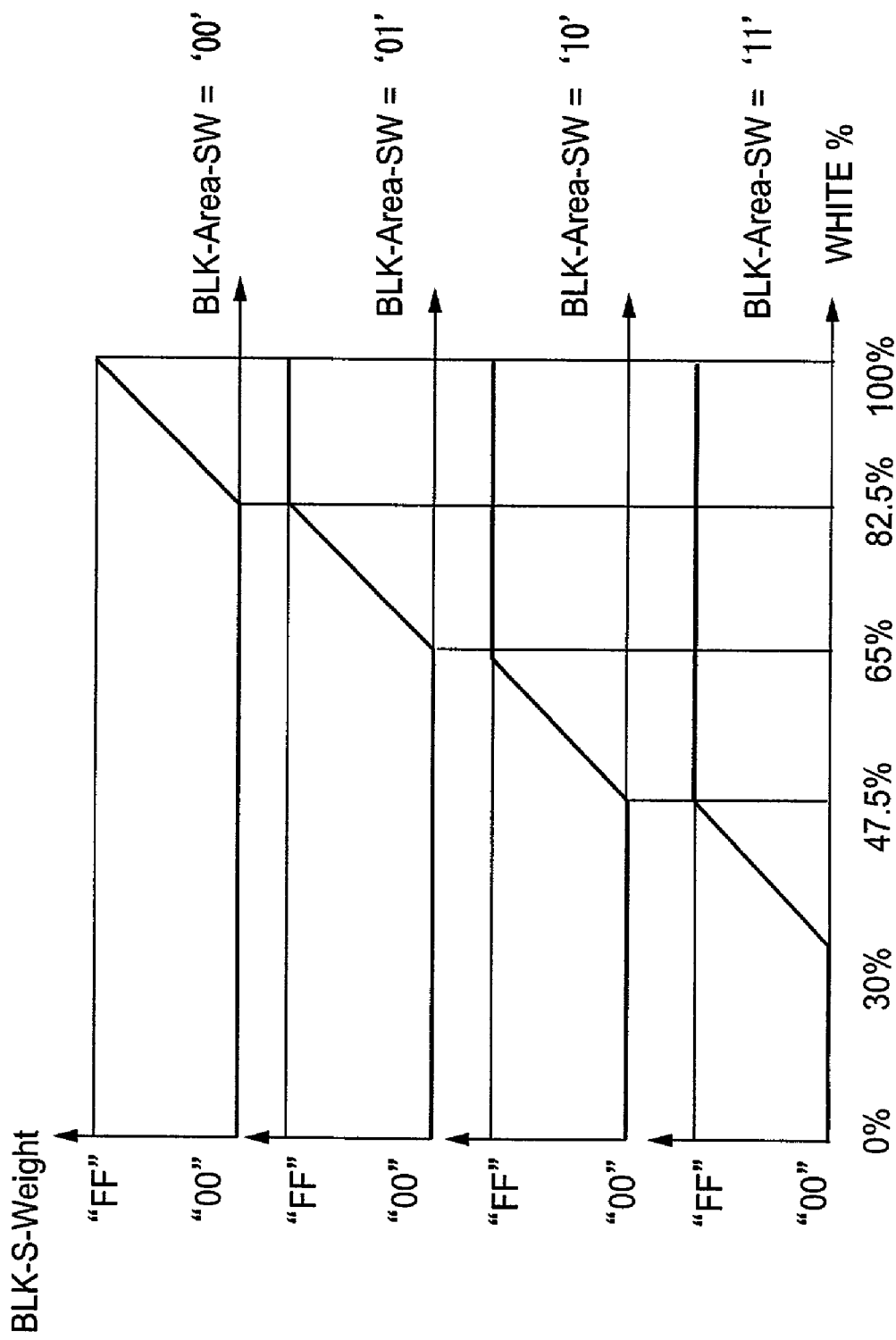
FIG. 15 is a graph illustrating the output of the bit width converter in FIG. 5 in the second embodiment.

In the second embodiment, the bit width converter 14 in FIG. 5 generates the BLK-S-Weight signal according to the black area selection signal BLK-Area-SW and the signal COUNTFLD indicating the number of white-level pixels in the current field. The BLK-S-Weight signal now has the characteristic shown in FIG. 15, in which the horizontal axis indicates the proportion of white-level pixels in a field. This characteristic is a combination of four characteristics, which are selected by the black area selection signal BLK-Area-SW.

FIG. 16 gives explicit formulas for the BLK-S-Weight signal output by the bit width converter 14 according to the black area selection signal BLK-Area-SW and the count signal COUNTF1D in the second embodiment. Since the BLK-S-Weight signal is now based on a count of the number of white-level pixels per field, it is obtainable by selection logic only, without the need for a bit complementation operation. Accordingly, the bit width converter 14 has an even simpler internal structure in the second embodiment than in the first embodiment, although the amount of black compression and stretching is still adjusted according to the proportion of each field covered by black picture elements.

In both of the preceding embodiments, the black level is stretched by an amount that depends not only on data stored in the ROM 21 but also on a weighting signal BLK-S-Weight. Specifically, the output from the ROM 21 is weighted according to the proportional black area per field of the picture. This scheme enables the black level to be controlled effectively by a comparatively small digital circuit, storing a comparatively small amount of data in the ROM 21. Furthermore, the data are stored in the ROM 21 in such a way that black level control can be initiated at different points on the luminance scale, depending on the BLK-S-Point signal.

The variations of the first embodiment noted above also apply to the second embodiment, and those skilled in the art will recognize that further variations are possible within the scope of the invention as claimed below.

What is claimed is:

1. A signal-processing apparatus for controlling the black level of a digitized luminance signal included in a picture signal, comprising:

a memory storing data for adjusting the black level of the luminance signal, and outputting said data according to a value of the digitized luminance signal;

a black area detection circuit detecting an amount of black area in the digitized luminance signal and generating a weighting signal;

a first multiplier multiplying the data output from the memory by the weighting signal to obtain a product; and a second multiplier multiplying the digitized luminance signal by a value responsive to said product, thereby adjusting the black level of the digitized luminance signal.

2. The signal-processing apparatus of claim 1, wherein the memory stores data for adjusting the black level of the digitized luminance signal from a plurality of starting points, and the data output from the memory are selected according to a signal specifying the starting point, said signal being input together with the digitized luminance signal.

3. The signal-processing apparatus of claim 1, further comprising a subtractor subtracting said product from a predetermined value to obtain said value responsive to said product.

4. The signal-processing apparatus of claim 1, wherein the black area detection circuit compares the digitized luminance signal with a reference value, counts occurrences of a predetermined comparison result to obtain a count value having a plurality of bits, and generates the weighting signal according to values of predetermined ones of said plurality of bits.

5. The signal-processing apparatus of claim 4, wherein the black area detection circuit receives a switching signal together with the digitized luminance signal, and the weighting signal varies from a maximum value to a minimum value over a range of count values selected by the switching signal, the weighting signal having said maximum value below said range of count values and having said minimum value above said range of count values.

6. The signal-processing apparatus of claim 5, wherein said range is a range in which certain upper bits of the count value have selected bit values.

7. A method of controlling the black level of a digitized luminance signal included in a picture signal, comprising the steps of:

(a) storing data for adjusting the black level of the luminance signal in a memory;

(b) outputting said data according to a value of the digitized luminance signal;

(c) detecting an amount of black area in the digitized luminance signal and generating a weighting signal;

(d) multiplying the data output from the memory by the weighting signal to obtain a product; and (e) multiplying the digitized luminance signal by a value responsive to said product, thereby adjusting the black level of the digitized luminance signal.

8. The method of claim 7, wherein said step (a) includes storing data for adjusting the black level of the luminance signal from a plurality of starting points, and said step (b) includes selecting the data output from the memory according to a signal specifying the starting point, said signal being input together with the digitized luminance signal.

9. The method of claim 7, further comprising the step of subtracting said product from a predetermined value to obtain said value responsive to said product.

10. The method of claim 7, wherein said step (c) comprises the further steps of:

comparing the digitized luminance signal with a reference value;

counting occurrences of a predetermined comparison result to obtain a count value having a plurality of bits; and generating the weighting signal according to values of predetermined ones of said plurality of bits.

11. The method of claim 10, wherein said step further comprising the steps of:

receiving a switching signal input together with the digitized luminance signal; and selecting a range of count values according to the switching signal, the weighting signal having a maximum value below said range of count values, varying from the maximum value to a minimum value over said range of count values, and having the minimum value above said range of count values.

12. The method of claim 11, wherein said range is a range in which certain upper bits of the count value have selected bit values.

* * * * *